United States Patent [19]
Duta et al.

[11] Patent Number: 5,836,076
[45] Date of Patent: Nov. 17, 1998

[54] ALIGNING SYSTEM AND MACHINE FOR A DOUBLE ENVELOPING SPEED REDUCER

[75] Inventors: Oprea Duta, Clayton; Randy R. Prom, St. Charles, both of Mo.

[73] Assignee: Emerson Electric Co., St. Louis, Mo.

[21] Appl. No.: 745,173

[22] Filed: Nov. 7, 1996

[51] Int. Cl.$^6$ .......................... B23Q 17/00; G01M 13/02; F16H 57/02
[52] U.S. Cl. .......................... 29/893.1; 74/606 R; 74/425; 73/162; 29/407.05
[58] Field of Search .................................. 74/606 R, 425; 73/162; 33/501.7, 501.13; 29/893.1, 407.05, 407.01

[56] References Cited

U.S. PATENT DOCUMENTS

| | | |
|---|---|---|
| 3,064,809 | 11/1962 | Anthony et al. . |
| 3,708,857 | 1/1973 | Pfeiffer . |
| 4,020,715 | 5/1977 | Sollars . |
| 4,026,163 | 5/1977 | Merkert ..................................... 74/425 |
| 4,047,449 | 9/1977 | Popov . |
| 4,261,218 | 4/1981 | Eagan, Sr. . |
| 4,586,393 | 5/1986 | Mooney et al. . |
| 4,739,671 | 4/1988 | Nelson . |
| 4,951,519 | 8/1990 | Ohtsuka . |
| 5,018,403 | 5/1991 | Umezono et al. . |
| 5,024,122 | 6/1991 | Parzl et al. ............................. 74/606 R |
| 5,056,213 | 10/1991 | Behnke et al. ..................... 74/606 R X |
| 5,501,117 | 3/1996 | Mensing et al. ................... 74/606 R X |
| 5,502,882 | 4/1996 | Duta et al. ............................ 29/407.05 |
| 5,590,561 | 1/1997 | Duta et al. ................................. 73/162 |
| 5,634,371 | 6/1997 | Duta et al. ................................. 73/162 |

FOREIGN PATENT DOCUMENTS

| | | |
|---|---|---|
| 0250844 | 5/1987 | European Pat. Off. . |
| 1055845 | 4/1959 | Germany . |
| 3416563 | 8/1984 | Germany . |
| 0041334 | 2/1991 | Japan . |
| 0163327 | 7/1991 | Japan . |
| 524993 | 11/1976 | U.S.S.R. . |

OTHER PUBLICATIONS

Patent Abstracts of Japan, vol. 17 No. 186(M–1395), 12 Apr. 1993 & JP–A–43 337144 (Daihatsu) 25 Nov. 1992, abstract.

*Primary Examiner*—Vinh T. Luong
*Attorney, Agent, or Firm*—Polster, Lieder, Woodruff & Lucchesi

[57] ABSTRACT

A method for assembling a double enveloping speed reducer assembly includes predetermining the thickness of the shims required to properly position a worm assembly and a worm gear assembly in the speed reducer such that the double enveloping worm spiral and the worm gear mesh at their centers of curvature. By predetermining the thickness of the shims, the speed reducer can be assembled without guesswork. The shim thicknesses are determined, in part, by determining the distance the center of curvature of both the worm spiral and the worm gear to preselected surfaces of the worm assembly and worm gear assembly. The method also includes placing the speed reducer housing and at least one of the bearing brackets for both the worm assembly and the worm gear assembly in gauges to determine various dimensions of the housing and brackets. The measured dimensions are then used to calculate the appropriate shim thicknesses, the shims are placed adjacent a surface of the brackets, and the speed reducer is assembled. A gear gauge is provided for locating the center of curvature of the worm spiral and worm gear.

14 Claims, 6 Drawing Sheets

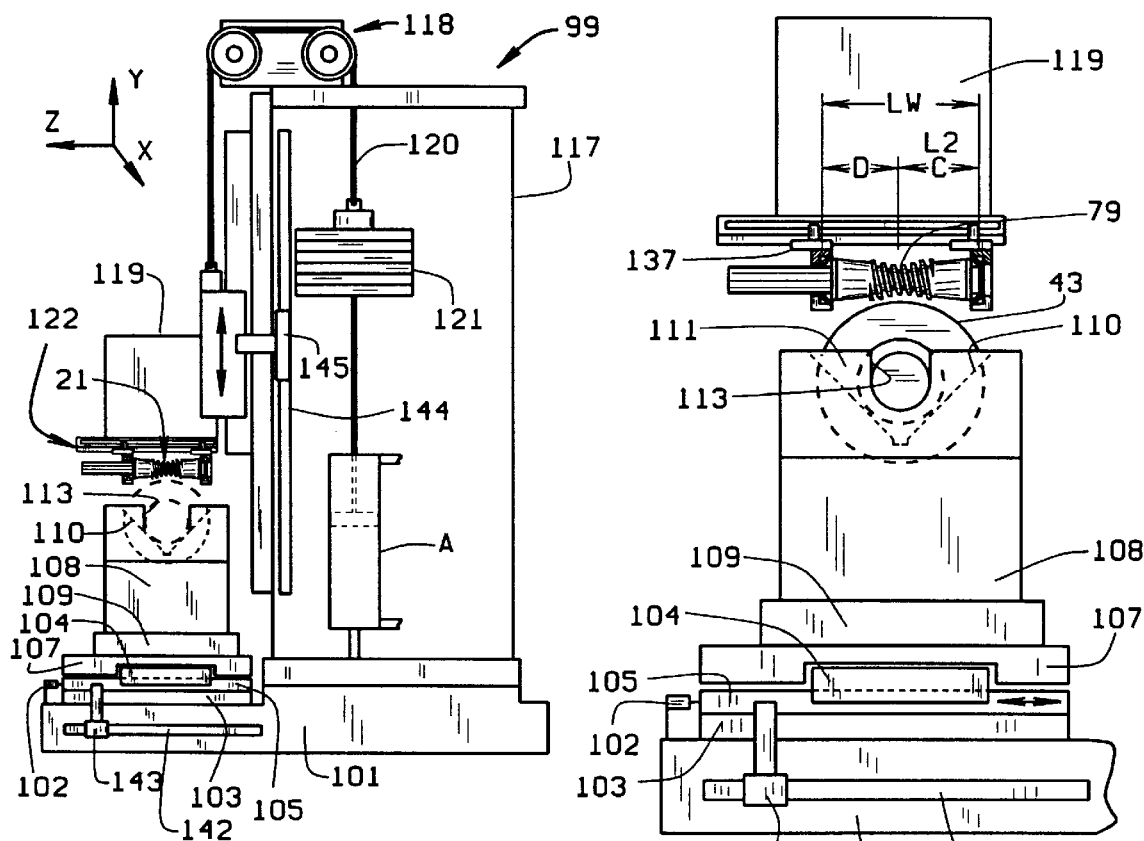
FIG. 5
FIG. 6
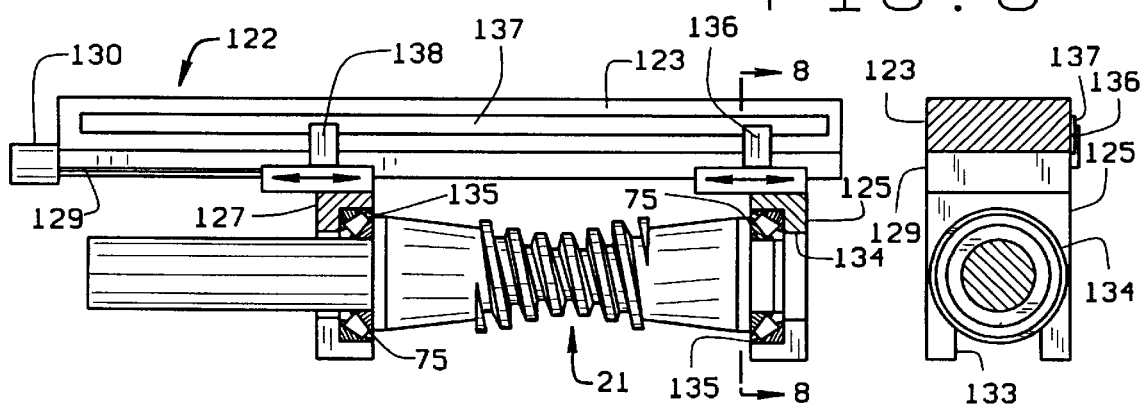
FIG. 7
FIG. 8

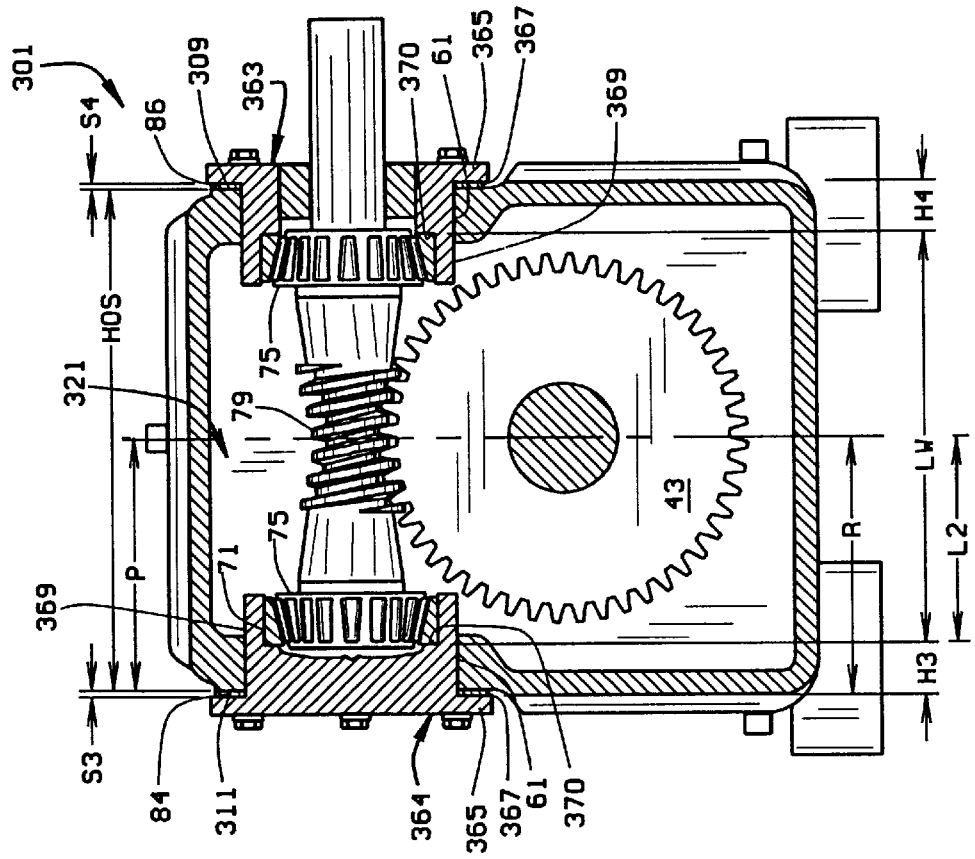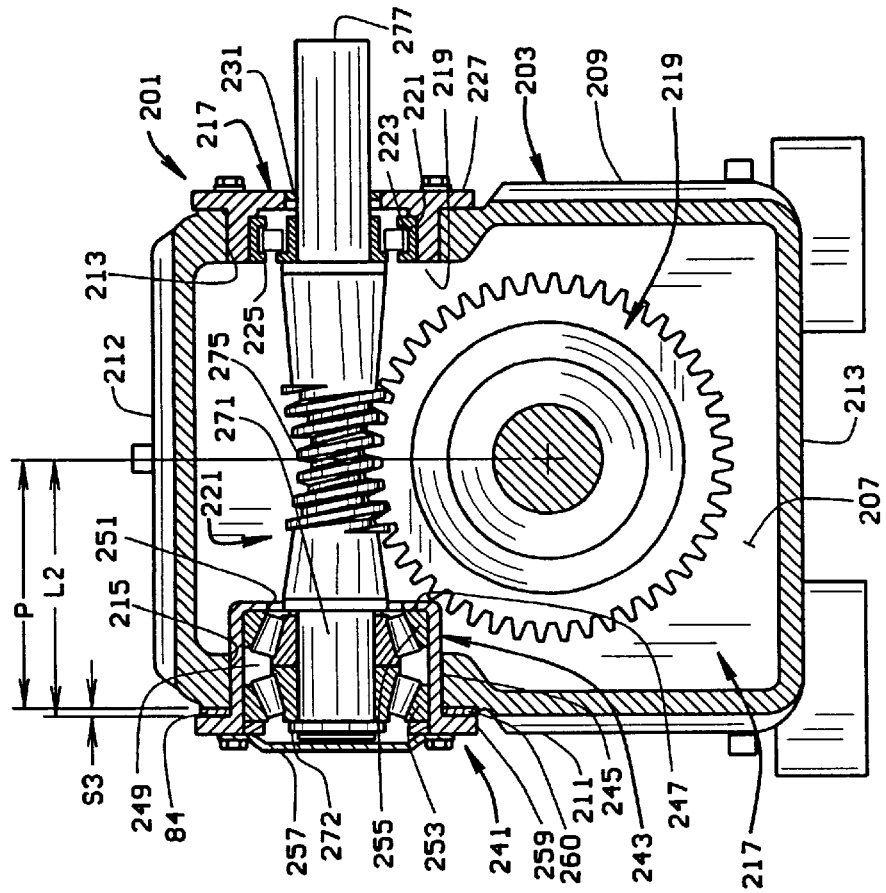

5,836,076

ALIGNING SYSTEM AND MACHINE FOR A DOUBLE ENVELOPING SPEED REDUCER

CROSS-REFERENCE TO RELATED APPLICATIONS

STATEMENT REGARDING FEDERALLY SPONSORED RESEARCH OR DEVELOPMENT

Not Applicable

BACKGROUND OF THE INVENTION

This invention relates to speed reducers, and in particular, to a method of assembling speed reducers having a double enveloping worm gear.

Speed reducer assemblies are widely used for applications in which a rotational speed, such as an output from a motor, is reduced to perform an intended function. Worm gear speed reducers commonly include a housing which supports a worm and a worm gear in meshing contact. In a 90° speed reducer, the axis of the worm gear output shaft is perpendicular to the worm. Many speed reducers use straight worms. However, double enveloping worms provide a better contact or meshing between the worm and the worm gear per linear length of the worm and are thus used in applications where larger loads need to be driven.

To maximize the useful life of a reducer assembly, the worm and worm gear must be properly aligned. In a double enveloping gear system, the worm and the worm gear both have curvatures and the curvature of the worm is perpendicular to the curvature of the worm gear. The worm and worm gear must therefore be aligned in two planes. If the worm gear and worm are not properly positioned with respect to each other, the teeth of the worm and worm gear will not mesh properly, the reducer assembly will not be able to carry the load, and the worm and worm gear will wear prematurely. The problems involved in improperly centering the worm and worm gear are increased when the reducer assembly includes double enveloping worms rather than straight worms. Because the center of curvature of the worm and worm gear do not necessarily coincide with the center of the worm or worm gear assemblies, properly positioning the worm and worm gear in the housing is difficult.

The majority of 90° speed reducers presently used have a housing which supports the worm through side walls and the worm gear through the front and back walls. The front and back of the housing define openings which are closed by brackets which support bearings of the worm gear assembly. Similarly, the side walls of the housing define openings which are closed by brackets which support the bearings of the worm assembly. Shims are provided in all four brackets to properly position the worm and worm gear with respect to each other and to achieve desired bearing end play. Proper positioning of the worm and worm gear is a time consuming method which requires that the speed reducer be assembled and disassembled several times.

The current method of assembling a double enveloping speed reducer includes initially applying a bluing ink to the worm spiral and worm gear threads, assembling the speed reducer, rotating the worm and worm gear without oil or other lubricant, and then disassembling the speed reducer. The contact pattern of the worm and worm gear is then checked—the use of the bluing ink allows the assembler to do this. The assembler then guesses at the shim sizes needed in both planes for the worm and worm gear to mesh properly. The assembler then starts above with the first step—he blues the threads of the worm and worm gear, reassembles the speed reducer without lubricant, rotates the worm and worm gear relative to each other, and disassembles the speed reducer to check the contact pattern between the worm and worm gear. The assembler than adjusts the shims in the two planes if necessary. The assembler repeats these steps of assembly, checking the contact pattern of the worm and worm gear, and adjusting the shim size until the double enveloping worm and the worm gear are properly centered in both planes. Because the shim thicknesses are determined without lubricating the gears, once the assembler finally does determine the proper shim thicknesses, the speed reducer is assembled a last time, this time with lubrication.

In U.S. Pat. No. 5,502,882, which is incorporated herein by reference, we disclosed a method and device for aligning a straight worm with a worm gear in a speed reducer assembly. That method, however, only operates in a single dimension and does not operate to center a double enveloping worm with respect to a worm gear.

BRIEF SUMMARY OF THE INVENTION

One object of the invention is to provide a method of assembling a 90° speed reducer having a double enveloping worm without need to assemble, disassemble and reassemble the speed reducer several times before the worm and worm gear are properly aligned.

Another object is to provide such a method which substantially reduces the human error involved in assembling a double enveloping speed reducer.

Another object is to provide a machine or gauge for determining the centers of curvature of both the worm gear and the worm to properly align the double enveloping worm with the worm gear.

These and other objects will become apparent to those skilled in the art in light of the following disclosure and accompanying drawings.

In accordance with the invention, generally stated, a method is provided for assembling a double enveloping speed reducer assembly which substantially eliminates the guess work of the prior methods of assembly. The speed reducer assembly includes a housing, a double enveloping worm assembly, and a worm gear assembly. The worm assembly includes a worm spiral defining a curvature, a worm shaft to which the worm spiral is fixed, and bearing assemblies through which the shaft is journaled. The worm gear assembly includes a worm gear having teeth which define a curvature, a shaft to which the worm gear is fixed, and bearing assemblies through which the worm gear shaft is journaled. The speed reducer assembly also includes a worm bracket and a worm gear bracket both of which define bearing shoulders to receive the respective bearings. The brackets each include a flange which rests adjacent an outer surface of the housing. Bearing shoulders are also formed on the inner surfaces of the walls which do not have bracket openings to support a second bearing assembly of the worm and worm gear assemblies. Shims are provided and are positioned against a surface of the bearing walls to properly position the worm spiral and worm gear within housing so that they will mesh properly. The method includes predetermining the thicknesses of the shims, placing the shims adjacent surfaces of the respective bearing shoulders, and installing the worm assembly, worm gear assembly, and brackets to the housing.

The shim thicknesses are predetermined by taking measurements of the housing, brackets, worm gear assembly and worm assembly. The width of the housing between the side walls and the depth of the housing between the back bearing shoulder and the front wall are measured. The distance between the bearing shoulders of the brackets and the inner surface of the bracket flanges is measured. The distance between the outer surfaces of the bearings for the worm assembly and for the worm gear assembly are measured. The distance between the center of curvature of the worm spiral and the outer surface of one of the worm assembly bearings and the distance between the center of curvature of the worm gear and the outer surface of one of the worm gear assembly bearings are also determined. These measured and determined distances are used, along with a predetermined end play of the shafts, to determine the appropriate thickness of the shims.

The worm and worm gear assemblies may not be symmetrical. Thus the distance from the center of curvature of the spiral or worm gear may not be at the midpoint between the bearings of the assemblies. Thus, locating the center of curvature of the worm spiral and the worm gear is an important step in determining the thickness of the shims. To locate the centers of curvature of the worm gear and worm spiral, the worm assembly and worm gear assembly are mounted in a gear gauge. The gear gauge includes a base, a table movable both longitudinally and laterally relative to said base, a worm gear support on the table which receives the worm gear assembly to hold the worm gear assembly against movement relative to the table, and a worm support which receives the worm assembly and which is suspended above the worm gear support. The worm support is movable vertically relative to the worm gear support and is preferably counter-weighted so that the worm spiral will mesh continuously with, but will exert only a small amount of pressure on the worm gear. The worm support is horizontally fixed and can move only vertically. Thus, when the worm gear is moved relative to the worm spiral, the worm spiral will move vertically due to its contact with the worm gear.

To determine the location of the centers of curvature of the worm spiral and worm gear, the worm spiral and worm gear are placed in their gauge. The table is moved along the X axis in an XZ plane and the position of the worm gear in the X-axis relative to a starting point and the position of said worm in the Y-axis relative to a starting point are monitored as said worm gear is moved along said X-axis. A curve in an XY plane is determined from paired X and Y coordinates as the worm gear is moved in the X-axis relative to the worm spiral. For this curve, the coordinates $(X_{1n}, Y_n)$ and $(X_{2n}, Y_n)$ are determine for a plurality of horizontal lines through the Y-axis where the lines intersect the curve in the XY plane. The midpoints $(X_{mn}, Y_n)$ between the points $(X_{1n}, Y_n)$ and $(X_{2n}, Y_n)$ are then determined and an average of the coordinates $X_{mn}$ is calculated to determine the X coordinate which corresponds to the distance L1. The distance L2 is determined in the same manner, however, the table is moved in the Z-axis and the curve is determined in the ZY-plane. The center of the worm spiral and the center of the worm gear are separated by a distance $Y_{CD}$, Thus, in averaging the $X_{mn}$ and the $Z_{mn}$ coordinates, the $X_{mn}$ and $Z_{mn}$ coordinates having corresponding $Y_n$ coordinates near $Y_{CD}$ are given greater weight. Preferably, the coordinates are weighted along a bell curve, with the X coordinated of $Y_{CD}$ being at the center of the bell curve. Preferably, the table is locked against movement in the X-axis while the table is being moved in the Z-axis, and vice versa. In a single pass, only a rough approximation of the location of the centers of curvature are determined for the worm spiral and worm gear. To refine the determination of the location of the centers of curvature, the table is moved to the X- and Z-coordinates determined for L1 and L2, and the above process is repeated.

Preferably, the gauge is provided with linear encoders which monitor the X and Z coordinates of the worm gear and the Y-coordinates of the worm spiral relative to a starting point. The encoders output a signal indicative of the relative positions of the worm and worm gear assemblies. The output of the linear encoders is received by a computer which will determine the X and Z coordinates which correspond to the distances L1 and L2 to determine the location of the centers of curvature of the worm gear and worm spiral.

The gauge includes a base having a longitudinal axis and a lateral axis, a first track on the base which extends either laterally or longitudinally of the base, a sub-table mounted on the first track for movement along the first track, a second track mounted on the sub-base for movement in the other direction along the base, and a table on the second track for movement along the track. Thus, if the sub-table moves laterally of the base (i.e., in the Z-axis), then the table moves longitudinally of the base (i.e., in the X-axis). Linear motion devices are provided to move the sub-table along the first track and to move the table along the second track. The worm gear support is mounted on the table. The use of the two sets of tracks enables the worm gear support, and hence the worm gear, to be moved both laterally and longitudinally of the base. Locks are provided to allow movement of the table in only one axis at a time, if desired. The linear motion devices may serve as such locks. As long a particular linear motion devices is not activated, the table will not move in a selected axis.

The worm spiral support is movably mounted to a vertical support to move vertically along the vertical support. The worm spiral support and worm gear support are similar in concept. Each includes first and second ends adapted to receive the bearings of the worm or worm gear assembly. At least one of the bracket ends is movable to enable the worm and worm gear assemblies to be easily inserted in their respective brackets. A linear encoder is preferably provided with the worm spiral support to determine the distance between the outer ends of the worm assembly bearings.

BRIEF DESCRIPTION OF THE SEVERAL VIEWS OF THE DRAWINGS

FIG. 5 is a side elevational view of the gauge and schematically shows the X, Y, and Z axes of the system;

FIG. 6 is an enlarged, sectional, side elevational view of the gauge;

FIG. 7 is an enlarged view of a worm support of the gauge, the worm being mounted therein;

FIG. 8 is a sectional view of the worm support taken along line 8—8 of FIG. 7;

FIG. 12 is a cross-sectional view of a second embodiment of a double enveloping worm gear speed reducer; and FIG. 13 is a cross-sectional view of a third embodiment of the double enveloping worm gear speed reducer.

DETAILED DESCRIPTION OF THE INVENTION

Figure 1:
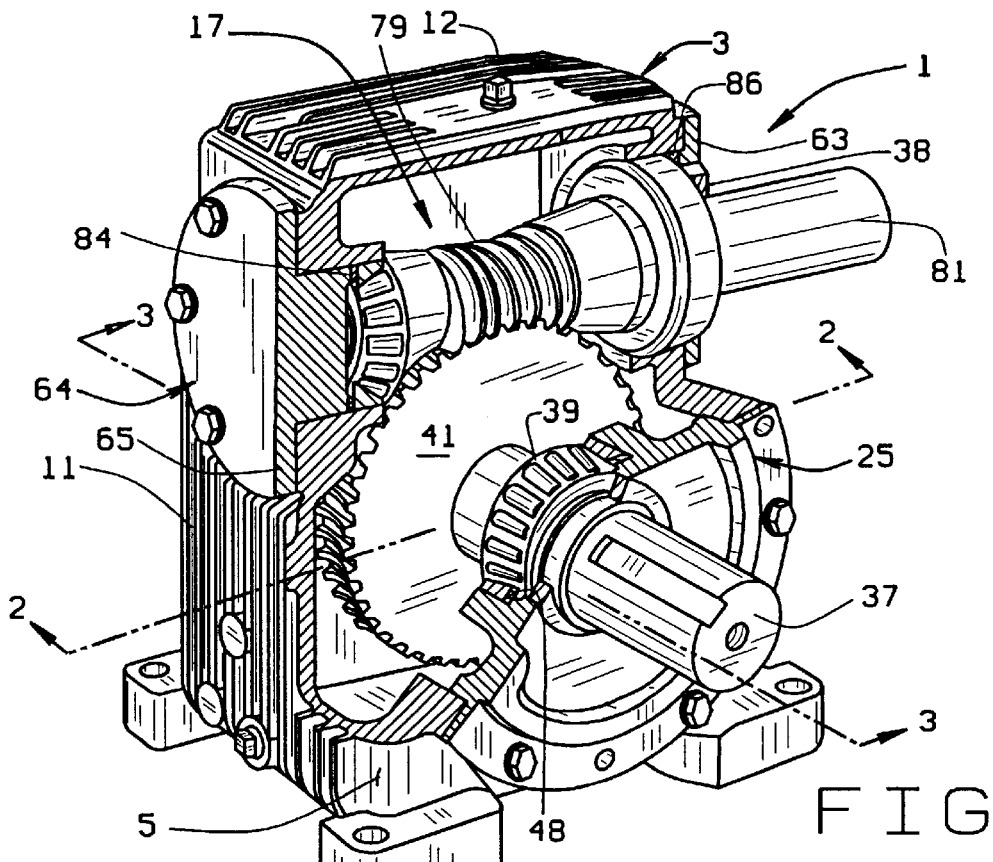
FIG. 1 is a perspective view of a double enveloping worm gear speed reducer assembly, partially cut away to show a double enveloping worm and worm gear of the reducer.
Figure 2:
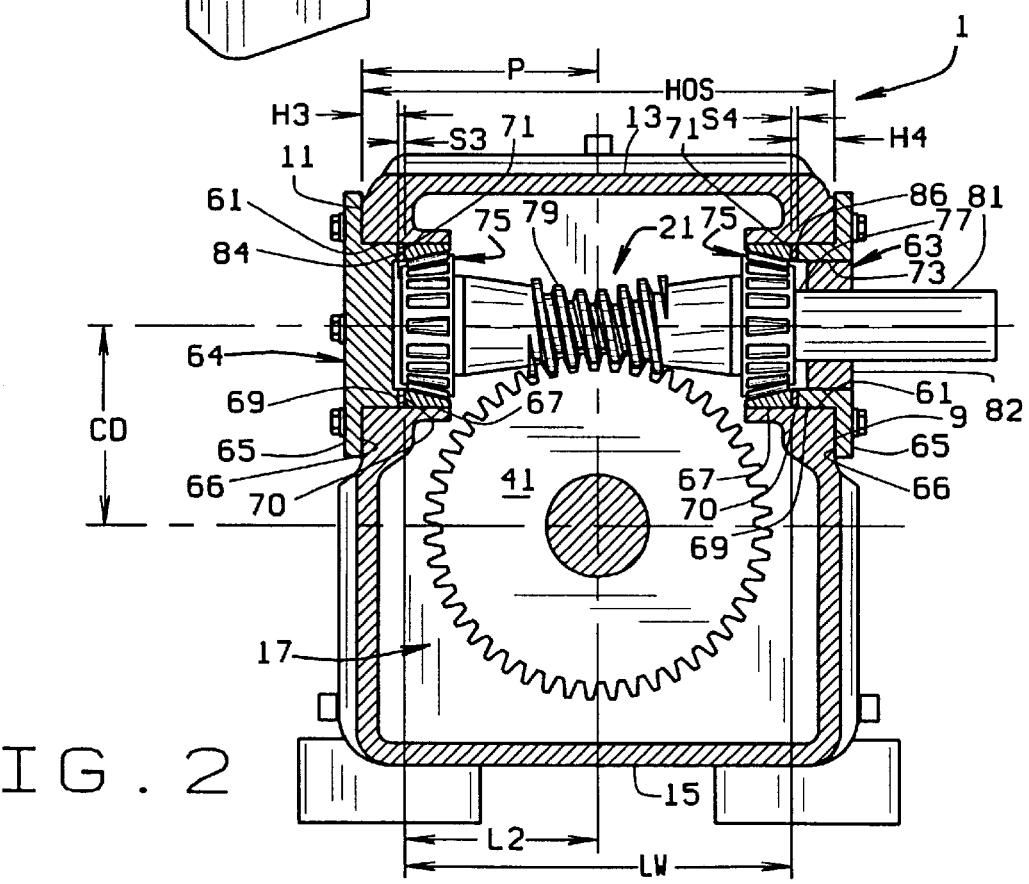
FIG. 2 is a cross-sectional view of the speed reducer assembly taken along line 2—2 of FIG. 1.
Figure 3:
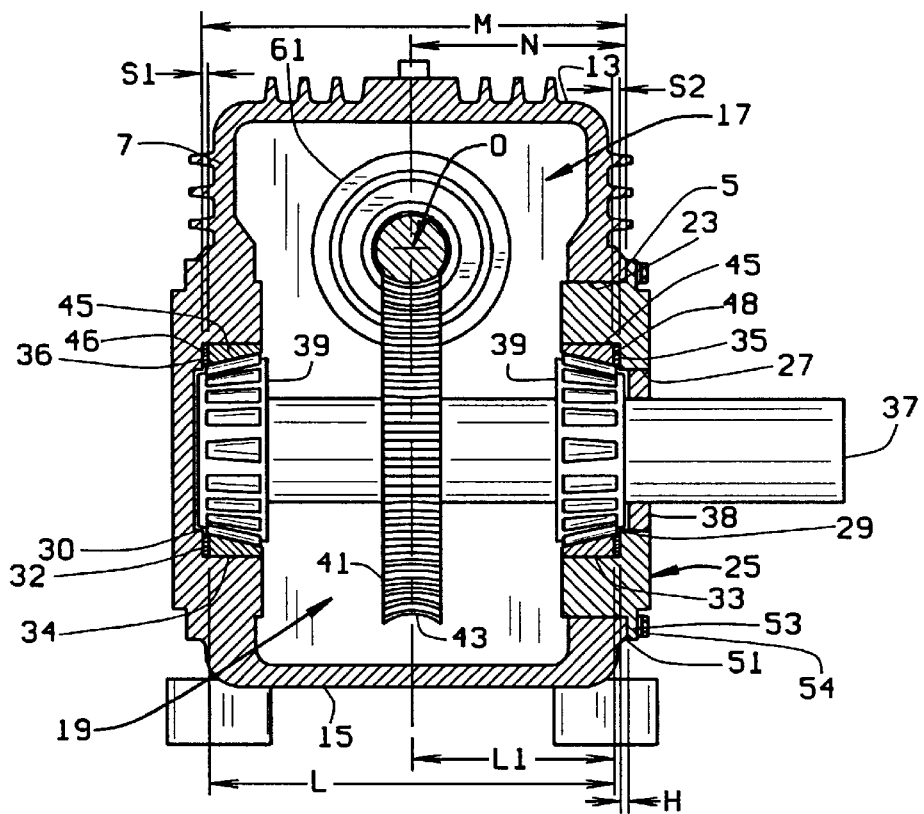
FIG. 3 is a cross-sectional view of the speed reducer assembly taken along line 3—3 of FIG. 1.

A double enveloping speed reducer 1 is shown generally in FIGS. 1–3. Although the speed reducer shown is a 90° speed reducer, it will be apparent to those skilled in the art that this invention has application in other designs of speed reducers. The speed reducer 1 has a housing 3 having front and back walls 5 and 7, right and left walls 9 and 11, a top 13 and a bottom 15. The walls 5, 7, 9, and 11, cooperate with the top 13 and bottom 15 to define a chamber 17 which receives a worm gear assembly 19 (FIG. 3) and a double enveloping worm assembly 21 (FIG. 2).

Turning to FIG. 3, the front wall 5 of the housing 3 includes an opening 23 through which the worm gear assembly 19 is inserted. The opening 23 is closed with a worm gear bracket 25 which includes a generally central opening 27. The bracket 25 includes a shoulder 29 and a generally circular inwardly extending wall 33 which surrounds the shoulder 29. The shoulder 29 and the wall 33 cooperate to define a bearing shoulder 35. The back wall 7 includes a first surface 30, a second surface 32 spaced from the first surface 30, and a wall 34 extending from the surface 32 into the chamber 17. The second surface 32 and the wall 34 together define a second bearing shoulder 36. The second bearing shoulder 36 is thus integrally formed with the inner surface of the housing back wall 7. The two bearing shoulders 35 and 36 are coaxially aligned and of the same dimensions. Although the housing is shown with the front wall 5 opened and the back wall 7 closed, the back wall 7 could be opened to receive a bracket substantially similar to the bracket 25.

The worm gear assembly 19 includes a shaft 37, tapered bearing assemblies 39 through which the shaft 37 is rotatably journaled, and a worm wheel 41 having teeth 43. The shaft 37 extends through the opening 27 in bracket 25 to define the output shaft of the speed reducer. The opening is sealed with an oil seal 38 to prevent oil, which lubricates the unit, from escaping the housing. The two bearing assemblies 39 are preferably mounted on the shaft 37 such that they face away from each other and taper downwardly and outwardly and as shown in FIG. 3. The worm wheel 41 is fixed to the shaft 37 to rotate the shaft, and has a curvature, as best seen in FIGS. 1 and 3. The bearing assemblies 39 are supported by the bearing shoulders 35 and 36. The outer races 45 of the bearing assemblies 39 are substantially adjacent the bearing shoulders 35 and 36.

To properly position the worm wheel 41 in the chamber 17, shims 46 and 48, having thicknesses S1 and S2, respectively, are provided and are placed between the outer races 45 of the bearing assemblies 39 and the bearing shoulders 35 and 36. Although the shims 46 and 48 are placed in the bearing shoulders 35 and 36, it will be apparent that the shim 48 could be placed between the inner surface 51 of the flange 53 and the outer surface of the front wall 5 of the housing 3. As is known, the flange 53 includes bolt holes, not shown, which receives bolts 54 to secure the bracket 25 to the housing 3.

Turning to FIG. 2, the side walls 9 and 11 have openings 61 vertically spaced from the opening 23 of the front wall 5 by a distance CD. The openings 61 are defined by surfaces 67 which extend into the chamber 17. The vertical spacing CD between the centers of openings 61 and the opening 23 is sufficient for the worm and worm gear to mesh. The openings 61 are closed by worm brackets 63 and 64 which are substantially identical and which support the worm assembly 21. The worm brackets include external flanges 65 having inner surfaces 66. The brackets also include a wall 69 which extends along, but is shorter than, the surfaces 67 which define openings 61. The wall 69 has and end surface 70. The end surface 70 of the brackets 63 and 64 define bearing shoulders 71 when the brackets are inserted in the housing, as can be seen. The bracket 63 includes a central opening 73. The side walls could be configured similarly to the front and back walls. That is, one wall could be closed and define a bearing shoulder and the other wall could be open to receive a worm bracket. This would eliminate the need for two worm brackets.

The worm assembly 21 includes tapered bearing assemblies 75, a shaft 77 journaled in the bearings, and a worm spiral 79 fixed to the shaft to rotate with the shaft. The distance CD noted above is the distance between the axes of the worm spiral shaft and worm gear shaft. It is the operating distance which allows the worm spiral and worm gear to mesh. The worm spiral 79 defines a double enveloping worm which, as is known, has a curvature so that the worm spiral 79 will mesh with the worm teeth 43 along a substantial portion of the length of the spiral. A portion of shaft 77 extends through opening 73 in bracket 63 to define an input shaft 81 which may be connected to a drive or motor. The opening 73 is sealed with an oil seal 82 as is known. Shims 84 and 86, having thicknesses S3 and S4, respectively, are placed between the surfaces 70 of the worm brackets 63 and 64 and the outer races of the bearings 75 to properly position worm 79 with respect to the worm wheel 41. The shims 84 and 86 could alternatively be positioned between the bracket flanges and the outer surfaces of the side walls.

As noted, the worm wheel 41 has a transverse or axial curvature which preferably matches the cross-sectional radius of the worm spiral 79 at the center of curvature of the worm spiral. The center of the curvature of the worm spiral 79 is preferably near the longitudinal (or cross-sectional) center of the worm spiral 79 or worm shaft 77. However, it may not coincide with the longitudinal center of the worm spiral. Similarly, the worm spiral 79 has a longitudinal or axial curvature which matches the radius of the worm gear. Thus, the worm and worm gear mesh in two axes, an X-axis, which is parallel to one of the shafts, and a Z-axis which is parallel to the other of the shafts. This meshing along two axes, rather than just one axis, as occurs with a straight worm, allows for fuller or more complete meshing of the worm gear teeth 43 with the worm spiral 79. This enables the speed reducer to transmit greater torques. To properly position the worm spiral and worm gear with respect to each other, the axial center of the worm spiral must be aligned as closely as possible with the center of curvature of the worm gear, and the radial center of the worm wheel must be aligned, as closely as possible, with the center of curvature of the worm. If the worm spiral and worm gear are not properly positioned, or aligned, with respect to each other, the worm and worm gear will not properly mesh. This will, at a minimum, lead to an inability of the speed reducer to transmit the desired power. It can also lead to premature failure of the speed reducer.

The shims 46, 48, 84, and 86 are used to properly position and align the worm and worm gear in the chamber 17. As set forth above, the determination of the appropriate shim thicknesses of the stack of shims is presently done by a hit and miss or trial and error method which requires that the speed reducer be assembled, disassembled, and reassembled numerous times. We have determined that by finding the centers of curvature of both the worm and the worm gear, the appropriate shim stack thicknesses (S1–S4) can be determined before the speed reducer is assembled by taking a few measurements of the speed reducer assembly 1. Our method eliminates the guess work presently involved in determining the appropriate sizes of the shim stacks and requires that the speed reducer be assembled only once. There is no disassembly and reassembly required.

The shims 46, 48, 84, and 86 are not single pieces, rather, they are made up of a plurality of thin rings of predetermined thicknesses, and are in reality stacks of shims. A plurality of rings are placed together to produce the appropriate shim stack thickness. To prevent the trial and error method of aligning the worm gear and worm, the thickness of the shim stacks must be known in advance. The combined thickness of the shims 46 and 48 is essentially the difference in (1) the distance (M) between outer surfaces of the front wall 5 around the opening 23 and the bearing shoulder 35 and (2) the distance (L) between the outside faces of bearing assemblies 39 plus the distance (H) between the inner surface 51 of the bracket flanges 53 and the bracket surface 31 against which the shim 48 is placed. (See FIG. 3). The combined thickness of shims 84 and 86 is essentially equal to the difference in (1) the width (HOS) of the housing between the outer surfaces of the side walls 9 and 11 adjacent the openings 61 and (2) the distance (LW) between the outer faces of bearing assemblies 75 plus the distances H3 and H4 of the brackets 63 and 64 between their respective bracket surfaces 70 and the inner surfaces 66 of the bracket flanges 65. Because the center of curvature of gear 41 or worm 79 is not necessarily at the center of the gear plate or worm assembly, the respective distances (M-L-H)–(HOS-LW-H3-H4) cannot be divided in half to arrive at the appropriate shim thickness. Rather, the thickness of the shims are determined by the equations:

(1) $S1 = M - N - (L - L1) - \frac{1}{2}EP1$;

(2) $S2 = M - H - L - S1 - EP1$;

(3) $S3 = P - H3 - L2 - \frac{1}{2}EP2$;

(4) $S4 = HOS - LW - H3 - H4 - S3 - EP2$ where S1=the thickness of shim stack 46;

S2=the thickness of shim stack 48;

S3=the thickness of shim stack 84;

S4=the thickness of shim stack 86;

M=the distance between the bearing shoulder 36 and the outer surface 5 of the front wall which surrounds the opening 23;

N=the distance between the radial center of worm spiral 79 (the center of the opening 61) and outer surface 5 of front wall which surrounds the opening 23;

L1=the distance from an outer face of a worm bearing assembly 39 to the center of curvature of worm gear 43;

L=the distance between outer faces of the worm bearing assemblies 39;

H=the distance between the shoulder 29 of the bracket 25 (i.e., the bearing shoulder) and the inner surface 51 of the bracket flange 53;

EP1=the end play or axial movement of worm gear shaft 37;

EP2=the end play or axial movement of the worm shaft 77;

P=the distance from the center of the worm wheel axis 37 (i.e., the center of the housing opening 23) to the outer surface 11 of the housing surrounding the opening 61;

HOS=the distance between the outer surfaces 9 and 11 of the sides of the housing surrounding the openings 61;

L2=the distance between the center of curvature of the worm spiral and an outer face of one of the bearing assemblies 75;

LW=the distance between the outer surfaces of the bearing assemblies 75 of the worm assembly 19;

H3=the distance between the inner surface 66 of the bearing assembly flange 65 and the surface 70 of the worm bracket 64; and H4=the distance between the inner surface 66 of the bearing assembly flange 65 and the surface 70 of the worm bracket 63. H3 and H4 may not be the same.

Figure 9:
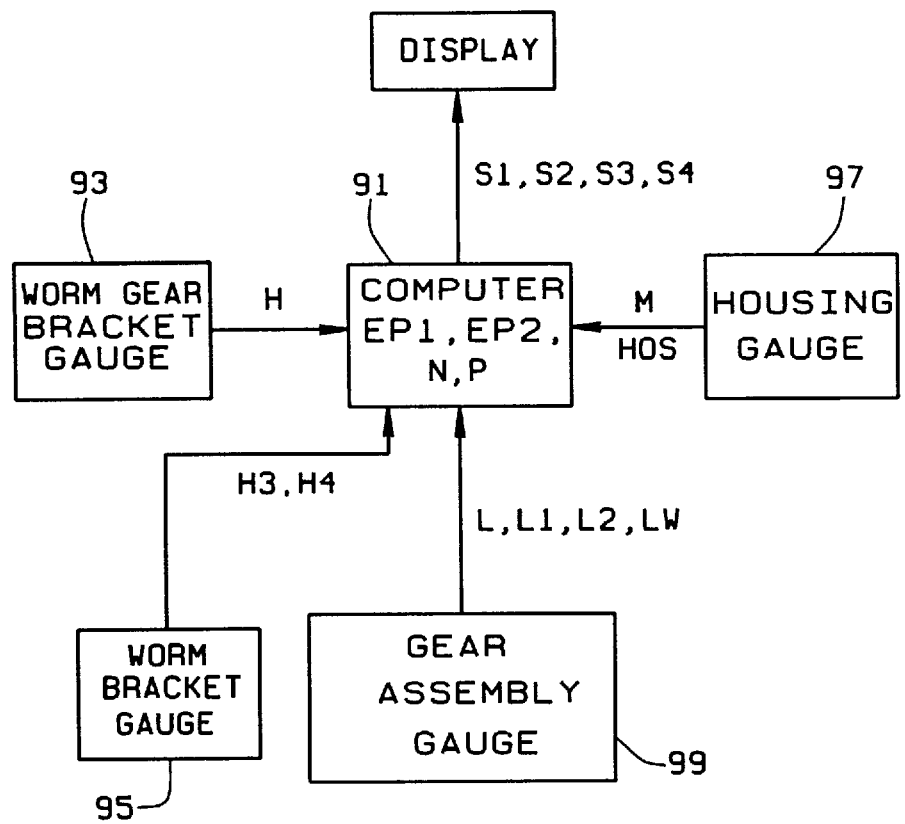
FIG. 9 is a block diagram of interconnected gauges used to measure the components of the speed reducer assembly to determine the thickness of shims to be used to properly align the worm and worm gear in the speed reducer.

EP1, EP2, N, and P are generally known distances and are entered or stored in a computer 91. (FIG. 9). If a high precision is desired, the distances N and P can be measured. To determine the proper thicknesses S1–S4 of shim stacks 46, 48, 84 and 86, the worm gear bracket 25 is placed in a worm gear bracket gauge 93, the worm brackets 63 and 64 are placed in a worm bracket gauge 95, the housing 3 (less the brackets) is placed in a housing gauge 97, and the worm assembly 21 and worm gear assembly 19 are mounted in a gear assembly gauge 99. If desired, two gauges 95 can be used, one gauge for each of the worm brackets. The worm gear bracket gauge 93 measures the distance H; the worm bracket gauge 95 measures the distances H3 and H4; the housing gauge 97 measures the distances M and HOS; and the gear assembly gauge 99 determines the distances L, L1, LW and L2. If the distances N and P are to be measured, these distances are also measured by the housing gauge 97.

If the housing side 7 has an opening to receive a bracket similar to the bracket 25, then that second bracket will also be placed in the worm gear gauge to measure a distance H2, analogous to the distance H. Further, if the housing side 7 were provided with a bracket receiving opening, the distance M would be the distance between the outer surfaces of the sides 7 and 9 adjacent the openings.

The gauges 93, 95, 97, and 99 are operatively connected to computer 91 and output signals to the computer indicative of the distances measured or determined. The computer then uses the measurements, along with the previously entered or stored values of P, N, EP1 and EP2, and according to the above equations, determines and displays the values of S1–S4 for the shim stacks 46, 48, 84, and 86. With the values determined by the computer, the appropriate shim pieces can be gathered to assemble the shim stacks 46, 48, 84, and 86. The computer preferably includes an output device or display, such as a video terminal or a printer, to which the computer outputs the determined shim thicknesses. The assembler can then read the shim thicknesses determined by the computer. With the proper shim thicknesses determined prior to assembly of the double enveloping speed reducer 1, the reducer assembly 1 can then be put together in a single step without the human error involved in the trial and error method of the prior art. As can be appreciated, this can dramatically reduce the assembly time and labor involved in producing the speed reducers.

Bracket gauges 93 and 95 and housing gauge 97 may be linear encoders, or any other measuring device that will determine the distances H, H3, H4, M, and HOS (and N and P if desired). Although the gauges 93, 95, and 97 are preferably electrical gauges which output signals to the computer corresponding to the dimensions measured, they could also be manual gauges, such as calipers, and the measured dimensions would be manually input into the computer 91. Because the centers of curvature of the worm gear 41 and the worm spiral 79 are not at the geometric axial center of the gear or worm, the distances L1 and L2 cannot be measured with a simple measuring device, such as a linear encoder or caliper, rather, they must be determined or calculated.

Figure 4:
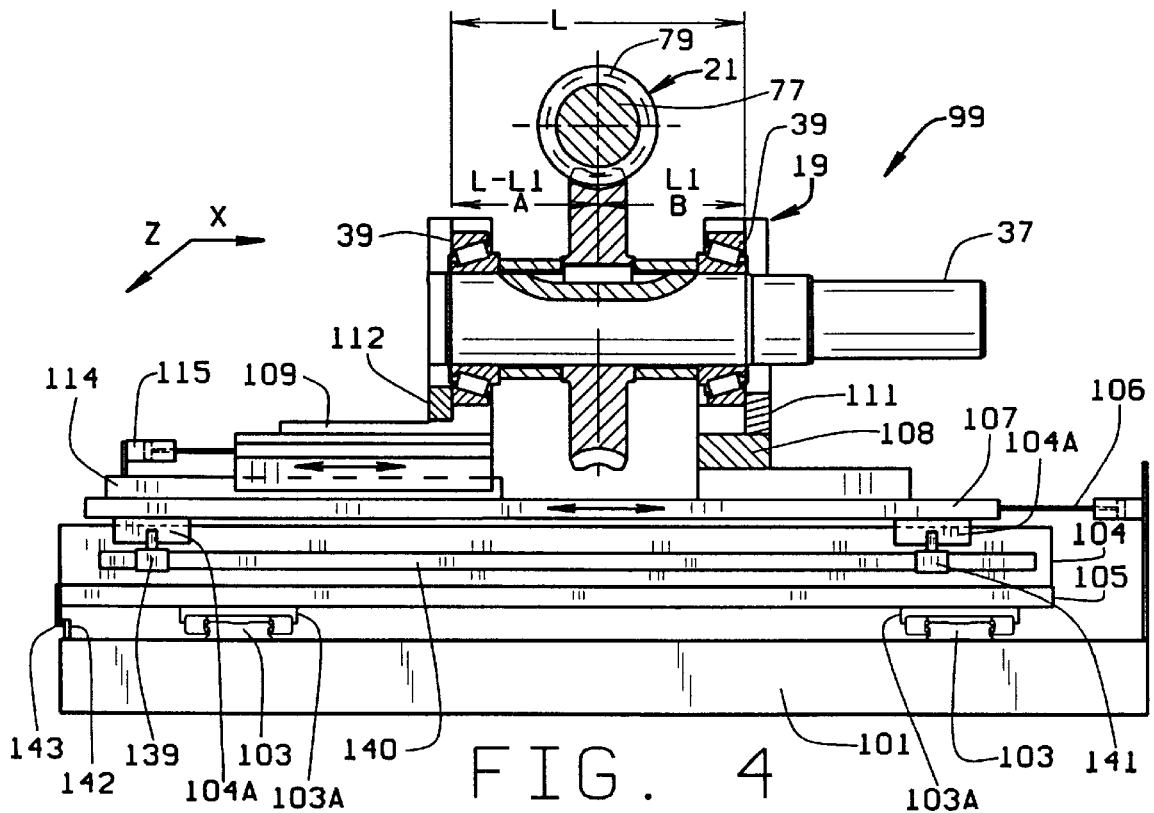
FIG. 4 is a front elevational view, partly in cross-section, of a gauge used to determine the centers of curvature of the worm and worm gear, a part of the gauge not being shown for purposes of clarity and shows, schematically, the X and Z axes of the system.

A preferred embodiment of gauge 99 is shown in FIGS. 4–8. Gauge 99 includes a base 101 having a first track 103 and a second track 104 mounted thereon with associated slides 103A and 104A. Tracks 103 and 104 are perpendicular to each other. Track 103 extends substantially the width of base 101 and track 104 extends substantially the length of base 101. As can be seen, track 103 is mounted on base 101 and a first table 105 is mounted on the track slide 103A to move laterally (or in the Z-axis). Track 104 is mounted on the first table 105, and a second table 107 is mounted on track slide 104A to move longitudinally (or in the X-axis). A linear motion device 102 (FIGS. 5 and 6), such as a piston or screw with an associated servo motor, may be provided to move table 105 along track 103 and base 101. Track 103, as best seen in FIG. 4, preferably includes two tracks, one track positioned near each end of table 105 to provide stability for table 105.

Table 107 is mounted on track 104 to move longitudinally along track 104. A piston 106 (FIG. 4), screw and servo motor, or other linear motion device can be provided to move table 107 along track 104. Because track 103 is mounted above track 104, table 107 can be moved both longitudinally (in the X-axis) and laterally (in the Z-axis) relative to base 101.

Front and back support blocks 108 and 109 are mounted to table 107. Each support block includes a "V" shaped notch 110 (FIG. 6) which receives the bearing assemblies 39 of the worm gear assembly 19. Stop plates 111 and 112 are secured to the outer faces of support blocks 108 and 109 to hold worm gear assembly 19 in place. Each stop plate has a "U" shaped cut-out 113 (FIG. 6) to accommodate the shaft 37 of the worm gear. To securely support the worm gear assembly 19 on the table 107, the support block 109 is movable axially with respect to table 107. The support block 109 is mounted on a track 114, and a piston 115 or other linear motion system (such as a screw with a servo motor) is operatively attached to rear block 109 to move it axially. When the worm gear assembly 19 is placed on support blocks 108 and 109, the rear support block 109 can be moved axially forward (to the right as shown in FIG. 4) to securely hold the worm gear assembly 19 in place to prevent axial movement of the worm gear assembly 19 with respect to table 107 while the gauge 99 is operating. Front stop 108 may also be made to be movable if desired.

A vertical support 117 (shown in FIG. 5, but not in FIG. 4 for purposes of clarity) extends up from the base 101 and includes a bracket or support 119 which suspends the worm assembly 21 above worm gear assembly 19. Weights 121 are attached to bracket 119 by way of a pulley system 118 and a cord 120. Weights 121 are sufficiently heavy to offset a majority of the weight placed on the worm gear assembly 19 by the weight of worm assembly 21, but allows the worm spiral 79 to fully and continuously mesh with worm gear 43. If the full weight of worm assembly 21 were to rest on gear 41, gear 41 could be damaged, and if the worm spiral and worm gear did not mesh, the gauge would not operate in the manner intended. The cord 120 is attached at one end to an actuator A which is operable to move the cord 120 to raise and lower the bracket 119. The worm assembly 21 may thus be lifted out of engagement, or lowered into engagement, with the worm gear. Although the use of the weights is the preferred method of controlling the amount of pressure applied by the worm spiral on the worm gear, the actuator can be operated to lift the bracket 119. This would eliminate the need for the weights.

When a speed reducer assembly uses a straight spiral worm, a master spiral can be mounted in the bracket 119. However, here, where an enveloping worm spiral and worm gear are used, no two worm/worm gear pair will be exactly alike. Thus, the centers of curvature for the worm and worm gear are preferably determined for a pair that will be used together. The bracket 119 therefore includes a worm spiral mount or bracket 122, shown in detail in FIGS. 7 and 8, to mount the worm spiral assembly 21 in the gauge 99. The bracket 122 includes a base 123 with two stops 125 and 127 mounted thereto. The stops 125 and 127 are both mounted on a track 129 so that they may be moved relative to each other. This will enable the support 122 to accept worm spiral assemblies of multiple sizes and to securely hold the worm spiral assembly in the support 122. An actuator 130, such as a piston, screw, or the like, is provided to move the rear stop 127 relative to the front stop 129. The actuator also acts as a clamp to hold the rear stop in a desired position to securely mount the worm assembly 21 in the bracket 122. The stop 125 is preferably provided with a manual lock. Stop 125 may thus be moved manually relative to the stop 127 and secured in a desired position to enable the support 122 to accept various sized worm spiral assemblies. The stop 125 may be provided with a frictional lock, such as a caliper-type brake, or with a pin that is insertable into a selected one of a series of discrete holes in the base.

Each stop 125 and 127 includes a slot or opening 133 sized to admit the worm shaft 77 into the stops 125 and 127. The slot 133 leads into a generally circular opening 134. The stops are also provided with inwardly directed shoulders 135 which are formed in the surface or edge defining the opening 134. The bearing assemblies 75 abut the shoulders 135. The shoulders 135 are sized to accept the bearing assemblies 75, and thus by moving the rear stop 127 and securing it in place, the worm assembly 21 can be secured in place in the bracket 122 against movement relative to the bracket 122. To place the worm assembly 21 in the bracket 122, the worm shaft 77 is passed through the slot 133 into the opening 134 and the bearing assemblies are seated on shoulders 135. The stop 127 is then moved by the actuator 130 to secure the worm assembly 21 in the bracket 123. The bracket 123 is also provided with a linear encoder strip 137 and transducers 138 and 136 which are connected to the stops 127 and 125, respectively, to provide the distance between the two stops, and hence the distance (LW) between outer surfaces of the outer races of the bearings 75.

Lastly, gauge 99 includes a linear encoder strip 140 on base 101 with two transducers 139 and 141 which measure movement of table 107 on track 104 and a linear encoder strip 142 on base 101 and a transducer 143 which measures movement of table 105 on track 103. Another linear encoder strip 144 and associated transducer 145 are mounted on vertical support 117 to measure the vertical position of the worm assembly 21. With linear encoder transducers 139, 141, 143 and 145, the position of the worm gear 41 in both the X- and Z-axes relative to a starting point can be determined, and with linear encoder transducer 145, the position of the worm assembly 21 in the Y-axis relative to a starting point can be determined. Thus, the position of the worm and worm gear are monitored in three axes (X, Y, and Z) and two planes (the XY plane and the ZY plane).

Figure 10:
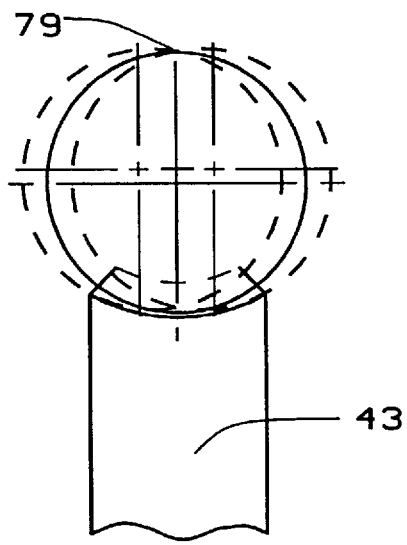
FIG. 10 is a diagrammatic sketch of the movement of the worm relative to the worm gear as the worm is moved transversely across the teeth of the worm gear.
Figure 11:
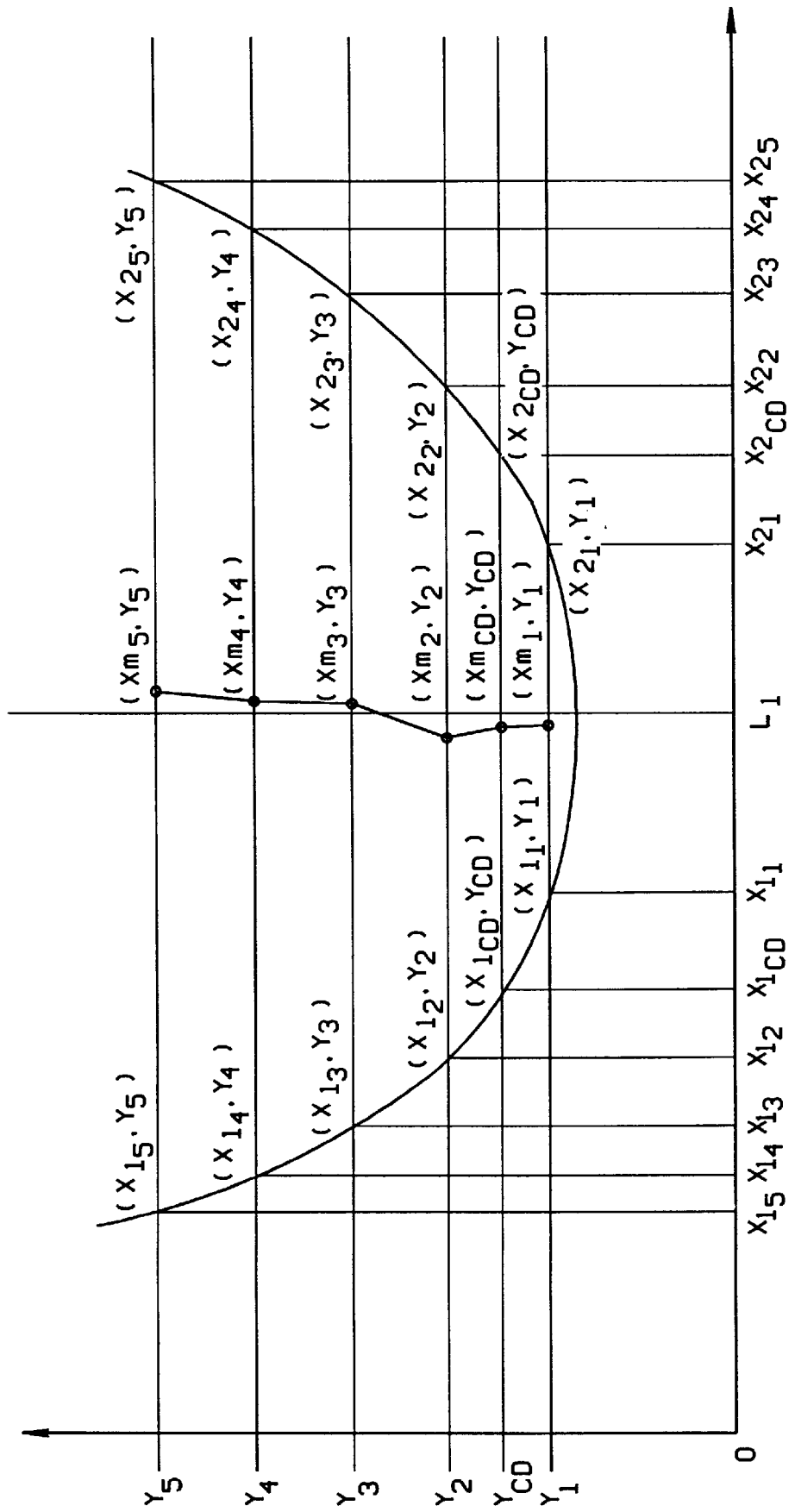
FIG. 11 is a schematic chart plotting the location of the radial center of the worm in the Y-axis as the worm gear is moved in the X-axis relative to the worm spiral determine the location of the center of curvature L1 of the worm gear.

Because both the worm gear 43 and the worm spiral 79 have curvatures, as the worm gear is moved relative to the worm spiral, the worm assembly 21 will move vertically and paired X,Y and Z,Y, coordinates will define two generally U-shaped patterns. One pattern will lie in the XY-plane and correspond to the curvature of the worm gear 43. This pattern is shown in FIGS. 10 and 11. The second pattern will lie in the Z,Y plane and will correspond to the curvature of the worm spiral 79.

A rough approximation of the location of the center of curvature of the worm spiral and worm gear can be found by determining the $(X,Y_1)$ and $(Z,Y_2)$ coordinates where the worm spiral 79 is at its lowest point in the XY plane and the ZY plane, respectively. Using gauge 99, this low point can be determined in several ways. With the worm assembly 21 and worm gear assembly 19 mounted in the gauge, table 107 is slowly moved by the linear motion devices 102 and 106 which move the table 107 in both the X- and Z-axes. As the table 107 moves longitudinally relative to base 101 (i.e., in the X-axis) the distances A and B (FIG. 4) between the center of the worm assembly 21 (which remains horizontally fixed) to the outside faces of worm gear bearing assemblies 39 are measured by encoders 139 and 141. Although the distances A and B change as table 107 moves, their sum remains constant and A+B=L. The distance B corresponds to the distance L1 for the lowest Y coordinate. Encoder 141 measures distance B and encoder 139 measures a distance A. Thus, gauge 99 will output signals indicative of both the distance L1 and the distance L.

Similarly, as the table 107 is moved across, or transversely of, the base 101 (i.e. in the Z-axis), the distances C and D (FIG. 6) between the center of the worm gear (which will be fixed relative to the longitudinal axis of the base 101) to the outside faces of the worm bearing assemblies 75 change. As with the distance A and B, although C and D change as the table moves, their sum remains constant and C+D=LW. Linear encoder 143 measures the distance C and the linear encoder transducers 136 and 138 measure the distance LW. The distance C corresponds to L2 for the lowest Y-coordinate. Gauge 99 thus will also output signals indicative of the distances L2 and LW.

The use of the computer allows for the use of many points so that the distances to the centers of curvature (L1, L2) can more accurately be determined. The location of the center of curvature of the worm gear 43 is determined from a plurality of points $(X_n,Y_n)$ which define a curve. The computer, as described in our above noted patent, can approximate the secants of lines connecting the points. Lines extending perpendicularly from the midpoint of the secants will intersect at the center or focus of the arc, and the X coordinate of the intersection will approximate the X coordinate corresponding to the distance L1. The Z coordinate corresponding to the distance L2 is determined in a similar manner.

More simply, the computer can monitor the X coordinate of the worm gear and the Y coordinate of the worm spiral to form a plurality of (X,Y) pairs. The distance L1 will be the X coordinate where the Y coordinate is the lowest. The distance L2 will be the Z coordinate where the Y coordinate is the lowest.

The distances L1 and L2 can also be determined by plotting Y v. B and Y v. C at small increments from one edge of the worm gear to the other. Such a plot would look similar to the plot of FIG. 11. The centers of curvature of the worm and worm gear will be the lowest position of each plot. From this position, the B coordinate will provide the distance L1, and the C coordinate will provide the distance L2. However, this may not be accurate unless a large number of points are taken.

Alternatively, if table 105 can slide on track 103 and track 103 can slide on tracks 104 virtually friction free, the weight of worm assembly 21 on the curvature of worm gear assembly 19 will cause the table 107 to slide both longitudinally and transversely relative to the base 101. The worm will come to rest at its lowest point, providing the centers of curvature of both gear 43 and worm spiral 79. At this point, measurements can be taken to determine L1 and L2.

Relying on the lowest point of the curve generated, however, assumes that the curves produced by the (X,Y) and (Z,Y) coordinates recorded while moving the worm gear in the X and Z axes are symmetrical. However, in most cases, due to manufacturing tolerances, the curves will not be symmetrical. The preferred method for determining the centers of curvature of the worm spiral and worm gear is shown in FIG. 11. As with the above noted method, the worm gear is moved in along the X and Z axes (not at the same time), and the horizontal (i.e., X or Z) coordinates are paired with vertical (i.e., Y) coordinates for a plurality of positions along the X and Z axes to produce a series of $(X_n,Y_n)$ and $(Z_n,Y_n)$ points which produce a curve, as shown in FIG. 11. In each curve (i.e., the curve in the XY plane and the curve in the ZY plain), a line through selected Y coordinates produces two X (or Z) coordinates where the line intersects the curves. That is, a horizontal line at each Y coordinate intersects the curve at two points $(X_{1n},Y_n)$ and $(X_{2n},Y_n)$. For each pair of points, the midpoint $(X_{mn},Y_n)$ is determined. As can be seen in FIG. 11, for a curve that is not symmetrical, the line connecting the midpoints will not be straight. To determine the center of curvature, the average $(X_{mave})$ of the $X_m$ coordinates is determined. Thus, the center of curvature of the worm and worm spiral lies at the coordinates $X_{mave}$, and $Z_{mave}$.

In using this preferred method, the 0 point of the Y-axis corresponds to the center of the worm gear axis, such that the Y coordinates determined in the procedure will be generally around the point $Y_{CD}$. As can be seen in FIG. 11, the point $Y_{CD}$ may be above the lowest point of the curve. At the operating distance CD, there will be some backlash—that is, the worm gear may be able to be rotated slightly when the worm spiral is maintained in place. This allows for variations in the width of the worm spiral and the gear teeth due to manufacturing tolerances. To allow or account for the backlash, in determining the X and Z coordinates corresponding to the distances L1 and L2, the X and Z coordinates which have corresponding Y coordinates closer to $Y_{CD}$ are given a greater weight than the X and Z coordinates having Y coordinates farther from $Y_{CD}$. The weighting of the $X_{m,n}$ coordinates may be weighted along a bell curve, where $Y_{CD}$ is located at the center of the bell curve, and the weight assigned to each point depends on its distance from the center of the bell curve.

To determine the location of the centers of curvature of the worm spiral and worm gear relative to selected surfaces on the worm assembly and worm gear assembly, the table 107 is first moved in one of the X- and Z-axes. An initial determination of the location of the centers of curvature for the worm spiral and worm gear are made. The table is locked against movement in the Z-axis and is moved first in the X-axis, for example. Thus, the gear is moved only in one axis at a time. Following the just noted procedure, the distance L1 is determined. The table is then locked at the determined X coordinate corresponding to the distance L1 and the table is moved in the Z-axis to determine the distance L2. This gives an initial estimate of the centers of curvature for both the worm gear and the worm spiral. To refine the determination of the location of the centers of curvature, the table is moved to the determined X and Z coordinates corresponding to the distances L1 and L2, and the above procedure is repeated.

As noted, the tables are held against movement at various intervals of the procedure. The tables 105 and 107 are thus provided with locks to prevent them from moving during appropriate intervals. The linear motion systems can operate as the locks. However, if a screw is used as the linear motion system, there will be a slight amount of play in the linear motion system which will allow the table to move slightly. This slight movement can affect the determination of the location of the centers of curvature. This problem is not as evident if an hydraulic system is used as the linear motion systems. Hydraulic fluid is not very compressible, and thus the table will not move. This would not be the case if a pneumatic system were use. The tables are thus preferably provided with friction locks, for example an expandable caliper type brake which will expand to frictionally grip the top of the base 101 and the bottom of the table 105 or the top of the table 107 and the bottom of the table 107. This will securely hold the tables against movement in a desired axis at a desired time.

As can be seen, gauge 99 provides a simple method of determining the location of the centers of curvature of an enveloping worm spiral and a worm gear relative to selected surfaces of the worm assembly and worm gear assembly, to enable a quick and simple determination of the appropriate shim thicknesses to use to properly position a worm gear with respect to a worm to provide a maximum life span of the reducer assembly.

A second speed reducer assembly 201 is shown in FIG. 12. The speed reducer assembly 201 is substantially similar to the speed reducer assembly 1 of FIG. 1 and includes a housing 203 having a front (not shown), a back 207, sides 209 and 211, a top 212, and a bottom 213 which define a chamber 217 which receives a worm gear assembly 219 and a worm assembly 221. Worm gear assembly 219 is identical to the worm gear assembly 19 and is held in housing 203 by a bracket identical to bracket 25 which secures worm gear assembly 19 in the housing. This will thus not be described herein.

Worm assembly 221 is slightly different from worm assembly 21 and is secured in the housing 203 by a pair of brackets different from the brackets 63 and 64 which secure worm assembly 21 in housing 3. The sides 209 and 211 of housing 203 define bracket receiving openings 213 and 215. Bracket opening 213 receives a bracket 217 which has an inner annual wall 219 and an inner annular step 221, which in combination define a bearing shoulder 223. A cylindrical bearing 225 is seated on the shoulder 223. The bracket 217 has an outer flange 227 through which bolts extend to secure the bracket to the housing 203. A shaft opening 231 is formed in the center of the bracket 217 to allow the shaft 277 to exit the housing to define an input shaft. An oil seal closes opening 231 around the shaft 277.

A bearing subassembly 241 is received in opening 215 in the side 211 of the housing. The subassembly 241 includes an assembly bracket or housing 243 having a cylindrical side wall 245 and a back wall 247 which define an outwardly opening chamber 249. A shaft opening 251 is formed centrally in the housing bottom 247. Two tapered bearing assemblies 253 and 255 are received in chamber 249 and are positioned therein such that they face each other, as shown in FIG. 12. The chamber 249 is closed with a cover 257. An annular flange 259 having an inner surface 260 extends radially outwardly from wall 245. The cover 257 extends partially over the flange 259, and bolts extend through the cover and flange to secure the subassembly 241 to the housing 203. When the subassembly is placed over the shaft 275, the edge of the worm spiral is substantially adjacent the back wall 247 of the subassembly housing 243. The shim 84 is positioned between the flange 259 and the outer surface of side 211. Only shim 84, having thickness S3, is used to position the worm spiral in the housing relative to the worm wheel. Unlike the assembly 1, there is only one shim used to position the worm spiral assembly in the housing. Thus, there is no shim 86 associated with the bracket 217.

The worm assembly 221 includes a worm shaft 271, a back end of which extends into subassembly 241 to be received in bearings 253 and 255, and a front end of which extends through the cylindrical bearing 225 and out of the housing to define an input shaft. A lock ring 272 is provided on the shaft to prevent the shaft from being pulled from subassembly 241. A worm spiral 275 is formed on shaft 271. As noted above, the tapered bearings 253 and 255 of subassembly 241 face each other. By positioning the bearings 253 and 255 in this fashion, they exert opposing forces on the shaft 271 to limit axial movement of the shaft in the subassembly 241. Because the shaft 271 of the worm assembly is securely held in the sub-assembly 241, the worm spiral may be positioned in the housing by changing the thickness of the shim 84.

The determination of the center of curvature of the worm and worm gear for speed reducer 201 is substantially the same as that for speed reducer 1. The distances relating to the worm measurements however must be defined for this embodiment.

S3=L2−P; where

S3=the thickness of shim stack 84;

L2=the distance between the center of curvature of the worm spiral 275 and the inner surface 260 of the flange 259 of the bearing subassembly 241; and P=the distance between the center of the worm gear 219 and the outer surface of the side 211 of the housing.

With the measurements or distances clarified for this embodiment, the equation for S3 noted above is used. The same equations set forth previously are used to determine the thicknesses S1 and S2. The same procedures are followed to determine the location of the centers of curvature of the worm spiral and worm gear. Obviously, the worm spiral bracket 122 will have to be modified to accept the housing 243. This, however, will not affect the operation of the system.

A third speed reducer 301 is shown in FIG. 13. Speed reducer 301 is substantially the same as speed reducer 1. The only difference lies in the type of bearing brackets used with the worm assembly 21 and the placement of the shims 84 and 86. The bearing brackets 363 and 364 which secure the worm assembly 21 in the housing 303 include an outer flange 365 through which bolts extend to secure the bracket to the walls 309 and 311 of the housing 303. The brackets each include an inwardly extending annular wall 369 having an inner seat 370 which, in combination define bearing shoulders which receive the bearing assemblies 75. Rather than the shim stacks 84 and 86 being positioned between the outer races of the bearing assemblies and the seats 370, they are positioned between the inner surfaces 367 of the bracket flanges 365 and the outer surfaces of the housing side walls 309 and 311.

The determination of the curvature of the worm and worm gear for assembly 301 will be substantially the same as for assembly 1. However, because the shims S3 and S4 have been moved, the equations for the thicknesses S3 and S4 have to be modified slightly.

S3=L2+H3−P−½EP2; and

S4=LW+H3+H4−HOS−S3−EP2, where:

L2=the distance from the center of curvature of the worm spiral 79 to the inner seat 367 of the worm bracket flange 365;

P=the distance between the radial center of the worm wheel 43 and the outer surface 311 of the housing side surrounding the opening 61;

H3=the distance on bracket 364 between the inner surface 367 of bracket flange 365 and the seat 370;

H4=the distance on bracket 363 between the inner surface 367 of bracket flange 365 and the seat 370;

HOS=the distance between the outer surfaces 309 and 311 surrounding the openings 61 of the sides of the housing; and LW=the distance between the outer surfaces of the worm spiral bearing assemblies 75.

As can be seen, the basic difference between this embodiment and the embodiment of FIG. 1 is that the shim stacks are placed against the outer face of the side walls, rather than against the worm spiral bearing shoulders. Thus, the equation above could be recast in terms of the equation for S3 set forth in conjunction with the first embodiment as follows:

S3=|P−H3−L2|−½EP2, that is, the absolute value of (P−H3−L2) less ½P2.

With the measurements or distances clarified for this embodiment, the equations noted above for S3 and S4 are used to determine the thicknesses of shims 84 and 86, and the equations noted previously for S1 and S2 are used to determine the thickness of shims 46 and 48. The same procedures are followed to determine the centers of curvature of the worm spiral and worm gear.

As can be appreciated, our method provides a method of determining the thicknesses of the shims necessary to properly align the worm and worm gear in a double enveloping speed reducer assembly. Our method, by taking a few measurements of the parts of the housing, eliminates the guess work which was required in prior art methods of assembling speed reducers. By eliminating the guess work, the time and difficulty inherent in the prior art assembly methods is considerably reduced.

The foregoing description is set forth for illustrative purposes only. Numerous variations within the scope of the appended claims will be apparent to those skilled in the art. For example, although the location of the centers of curvature are determined relative to the outer surfaces of the bearing assemblies, at least for the embodiments of FIGS. 1 and 13, other surfaces could also be used. The location of the centers of curvature could also be determined relative to the inner surface of the bearing assemblies, or the axial outer surface of the worm spiral, or the outer surfaces of the worm gear, for example. These examples are merely illustrative.

We claim:

1. A method of assembling a double enveloping speed reducer assembly; the speed reducer assembly including:

a housing having a front wall, a back wall, side walls, a top and a bottom; said walls, top and bottom defining a chamber;

a worm gear bracket on one of said housing walls, said worm gear bracket defining a first worm gear bearing shoulder; a second worm gear bearing shoulder on an opposite wall of said housing from said first worm gear bearing shoulder;

a worm bracket on another of said housing walls, said worm bracket defining a first worm bearing shoulder; a second worm bearing shoulder being positioned on an opposite wall of said housing from said first worm bearing shoulder;

a worm gear assembly received in said chamber, said worm gear assembly having a worm gear shaft, a worm gear on said worm gear shaft to rotate with said worm gear shaft, and worm gear bearing assemblies through which said worm gear shaft is rotatably journaled; said worm gear bearing assemblies being received in said worm gear bearing shoulders, said worm gear including a worm gear plate and gear teeth formed at a radial edge of said plate, said teeth having a curvature perpendicular to a plane of said gear plate;

a worm assembly received in said chamber, said worm assembly including a worm shaft, an enveloping worm spiral on said shaft, and worm bearing assemblies in which said worm shaft is rotatably journaled, said worm bearing assemblies being received in said worm bearing shoulders; said worm spiral defining a curvature parallel to the axis of said worm shaft; and a worm gear shim assembly including a first shim and a second shim associated with said worm gear assembly to position said worm gear in said chamber and a worm shim assembly including a third shim associated with said worm assembly to position said worm in said chamber such that centers of curvature of said worm and worm gear are aligned with each other;

said method including predetermining the thickness of said worm shim assembly and said worm gear shim assembly necessary to align centers of curvature of said worm spiral and worm gear when said worm assembly and worm gear assembly are placed in said housing; placing said shim assemblies adjacent surfaces of said housing; mounting said worm gear assembly and said worm gear bracket to said housing; and mounting said worm assembly and said worm bracket to said housing.

2. The method of claim 1 wherein at least one of said front and back walls of said housing defines a first opening and at least one of said side walls defines a second opening, said second opening being spaced vertically from said first opening;

said worm gear bracket closing said first opening; said worm gear bracket having an attachment flange adjacent an outer surface of said one of said front and back walls, said worm gear bracket flange having an inner surface; and said worm bracket closing said second opening; said worm bracket having an attachment flange adjacent an outer surface of said at least one side wall, said worm bracket flange having an inner surface.

3. The method of claim 2 wherein the step of predetermining the thickness of said shims includes:

measuring the distance M between the second worm gear bearing shoulder and an outer surface of the wall adjacent the first opening;

determining the distance N between a radial center of the worm spiral and the outer surface of the wall adjacent the first opening;

determining the distance L1 from an outer face of one of the worm gear bearing assemblies to the center of curvature of worm gear;

measuring the distance L between outer faces of the worm gear bearing assemblies;

measuring the distance H between the first worm gear bearing shoulder of the worm gear bracket and the inner surface of worm gear bracket flange;

determining the end play EP1 and EP2 of worm spiral shaft and the worm gear shaft;

measuring the distance P from a center of the worm wheel axis to an inner surface of the worm bracket flange;

measuring the distance HOS between outer surfaces of the side walls of the housing;

determining the distance L2 between the center of curvature of the worm spiral and an outer face of one of the worm bearing assemblies;

measuring the distance LW between the outer surfaces of the worm bearing assemblies; and measuring the distances H3 and H4 between the inner surfaces of the worm bearing bracket flanges and the first and second bearing shoulders;

wherein the thickness S1 of the first shim equals S1=M−N−(L−L1)−½EP1;

the thickness S2 of the second shim equals M−L−S1−H−EP1;

the thickness S3 of the third shim equals |(P−H3−L2)|−½EP2.

4. The method of claim 2 wherein each of said housing side walls has an opening, said worm bracket being received in one of said side wall openings, one of said worm spiral bearing assemblies being a cylindrical bearing which is supported by the worm bracket; the other bearing assembly being a bearing subassembly; said bearing subassembly comprising a subassembly housing which is received in the other of said side wall openings and which has a cylindrical side wall and a back wall which cooperate to define an outwardly opening chamber, said bearing subassembly housing back wall having a shaft opening formed centrally therein, and a flange extending radially from the wall of the bearing subassembly housing; and two tapered bearing assemblies received in the chamber and positioned therein to face each other; the step of predetermining the thicknesses of said shims including:

measuring the distance M between the second worm gear bearing shoulder and the outer surface of the front wall adjacent the opening in the front wall;

determining the distance N between the radial center of the worm spiral and the outer surface of the front wall adjacent the opening in the front wall;

determining the distance L1 from an outer face of a worm gear bearing assembly to the center of curvature of worm gear;

measuring the distance L between outer faces of worm gear bearing assemblies;

measuring the distance H between the floor of the bearing shoulder of the at least one worm gear bracket and the inner surface of the worm gear bracket flange of said at least one worm gear bracket;

determining the end play EP1 of the worm gear shaft;

measuring the distance P from the center of the worm wheel axis to an inner surface of the worm bracket flange; and determining the distance L2 between the center of curvature of the worm spiral and an outer face of a worm bearing assembly;

wherein the thickness S1 of the first shim equals S1=M−N−(L−L1)−½EP1; the thickness S2 of the second shim equals M−L−S1−H−EP1; the thickness S3 of the third shim equals P−L2;

said step of placing said third shim comprising placing said shim between said flange of said sub-assembly housing and the outer surface of said housing side wall.

5. The method of claim 3 wherein said worm shim assembly includes a fourth shim having a thickness S4, said step of positioning said worm shims including placing said worm shims in said first and second worm bearing shoulders, wherein the thickness S4 of said fourth shim equals HOS−LW−H3−H4−S3−EP2.

6. The method of claim 3 wherein said at least one worm bracket includes a first and a second worm bracket and each of said housing side walls includes an opening which receives one of said worm brackets; each of said brackets including a flange defining an inner surface; said worm shim assembly further including a fourth shim, wherein the thickness S4 of the fourth shim equals LW+H3+H4−HOS−S3−EP2; said step of positioning said shims including placing said shims between the inner surfaces of said flanges and outer surfaces of said housing walls.

7. The method of claim 3 wherein each of said housing side walls includes an opening, said assembly including a second worm bracket, said worm brackets including inwardly extending annular walls, said housing side walls having a width greater than said annular walls, said annular walls cooperating with a surface of said housing side wall openings to define the bearing shoulders which receive said worm bearing assemblies, said worm bearing assemblies being positioned adjacent said bearing bracket fingers, said worm shim assembly further including a fourth shim, wherein the thickness S4 of the fourth shim equals HOS−LW−H3−H4−S3−EP2; the step of positioning said third and fourth shims including positioning the third and fourth shims between outer surfaces of said worm bearing assemblies and the annular walls of said worm brackets.

8. The method of claim 3 wherein the distances EP1, EP2, N, and P are predetermined.

9. The method of claim 8 including a step of storing the distances EP1, EP2, N, and P in a computer;

the step of measuring the distance H including placing the worm gear bracket in a worm gear bracket gauge and supplying the distance H to the computer;

the step of measuring the distances M and HOS including placing the housing in a housing gauge and supplying the distances M and HOS to the computer;

the step of measuring the distances H3 and H4 including placing said one worm brackets in a worm bracket gauge and supplying the distances H3 and H4 to the computer; and the step of determining the distances L, L1, L2, and LW including placing the worm gear assembly and the worm assembly in a gear assembly gauge; the gear assembly gauge outputting signals indicative of the distances L, L1, L2, and LW to the computer; and displaying the calculated thicknesses of the shims.

10. The method of claim 9 wherein said housing gauge, the worm bracket gauge and the worm gear bracket gauge are electronic gauges, said gauges being in electrical communication with the computer, the steps of measuring the distances M, HOS, H, H3, and H4 including activating said gauges to generate signals indicative of the distances, and transmitting the signals to the computer.

11. The method of claim 9 wherein said gear assembly gauge includes a base, a table movable along an X axis and a Z axis in an XZ plane relative to said base; a support on said table which receives the worm gear assembly to hold the worm gear assembly against movement relative to the table; a second support suspended above said worm gear assembly support which receives said worm assembly, said second support being movable vertically along a Y-axis relative to said worm gear assembly support; wherein said step of determining the distances L, L1, L2, and LW include:

(a) securing said worm gear assembly in said worm gear assembly support;

(b) securing said worm assembly in said second support;

(c) placing the worm spiral in meshing contact with said worm gear;

(d) moving said table along said X axis in said XZ plane and monitoring the position of said worm gear in the X-axis relative to a starting point and monitoring the position of said worm in the Y-axis relative to a starting point as said worm gear is moved along said X-axis to generate a plurality of X,Y coordinates;

(e) calculating a curve in the XY plane from the X,Y coordinates;

(f) for the curve in the XY plane, determining the coordinates $(X_{1n}, Y_n)$ and $(X_{2n}, Y_n)$ where a horizontal line through the Y-axis at $Y_n$ intersects the curve in the XY plane, determining midpoints $(X_{mn}, Y_n)$ between the points $(X_{1n}, Y_n)$ and $(X_{2n}, Y_n)$, and averaging the coordinates $X_{mn}$ to determine the coordinate $X_{mave}$ which corresponds to the distance of one of L1 and L2;

(g) securing the table at the X coordinate $X_{mave}$;

(h) moving said table along said Z-axis, monitoring the position of the worm gear in the Z-axis relative to a starting point and monitoring the position of said worm spiral in the Y-axis relative to a starting point as said worm gear is moved along said Z-axis to generate a plurality of Z,Y coordinates to generate a curve in the ZY plane from the Z,Y coordinates; and (i) for the curve in the ZY plane, determining the coordinates $(Z_{1n}, Y_n)$ and $(Z_{2n}, Y_n)$ where a horizontal line through the Y-axis at $Y_n$ intersects the curve in the ZY plane, determining midpoints $(Z_{mn}, Y_n)$ between the points $(Z_{1n}, Y_n)$ and $(Z_{2n}, Y_n)$, and averaging the coordinates $Z_{mn}$ to determine the coordinate $Z_{mave}$ which corresponds to the distance of the other one of L1 and L2.

12. The method of claim 11 including positioning said table at said X- and Z-coordinates, $X_{mave}$ and $Z_{mave}$, in the XZ-plane, and repeating steps (d)–(i).

13. The method of claim 11 wherein the center of the worm spiral and the center of the worm gear are separated by a distance $Y_{CD}$, the step of averaging the $X_{mn}$ and the $Z_{mn}$ including giving greater weight to the $X_{mn}$ and $Z_{mn}$ coordinates having corresponding $Y_n$ coordinates near $Y_{CD}$.

14. The method of claim 13 wherein the $X_{mn}$ and $Z_{mn}$ coordinates are weighted along a bell curve.

* * * * *

UNITED STATES PATENT AND TRADEMARK OFFICE
CERTIFICATE OF CORRECTION

PATENT NO. : 5,836,076
DATED : November 17, 1998
INVENTOR(S) : Oprea Duta and Randy R. Prom It is certified that error appears in the above-indentified patent and that said Letters Patent is hereby corrected as shown below:

```
Claim     3,
Column 17, line 21, in the equation, after "(L-L1)-",
replace "V2EP1" with --1/2EP1)--.
```

Signed and Sealed this

Fourth Day of May, 1999

*Attest:*

Q. TODD DICKINSON

*Attesting Officer*   Acting Commissioner of Patents and Trademarks